April 14, 1953　　　　H. N. BLISS　　　　2,634,884
CONTROL MECHANISM FOR CONTROLLING VALVES
Filed Oct. 8, 1946　　　　　　　　　　　　　　2 SHEETS—SHEET 1
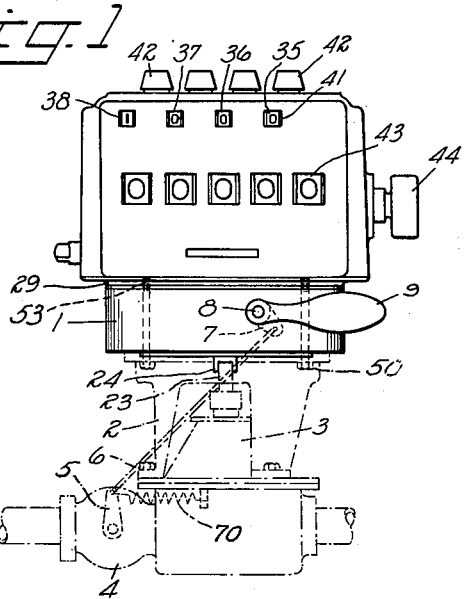
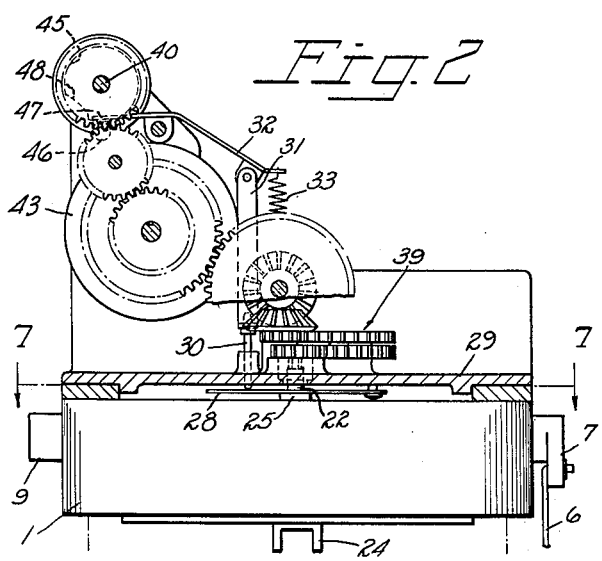
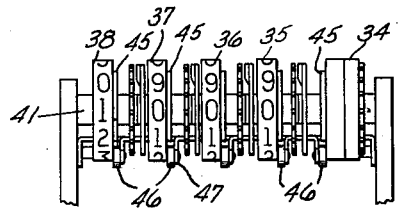
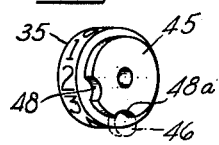
Inventor
HARVEY N. BLISS
By N. Clay Lindsey
Attorney April 14, 1953 H. N. BLISS 2,634,884
CONTROL MECHANISM FOR CONTROLLING VALVES
Filed Oct. 8, 1946 2 SHEETS—SHEET 2
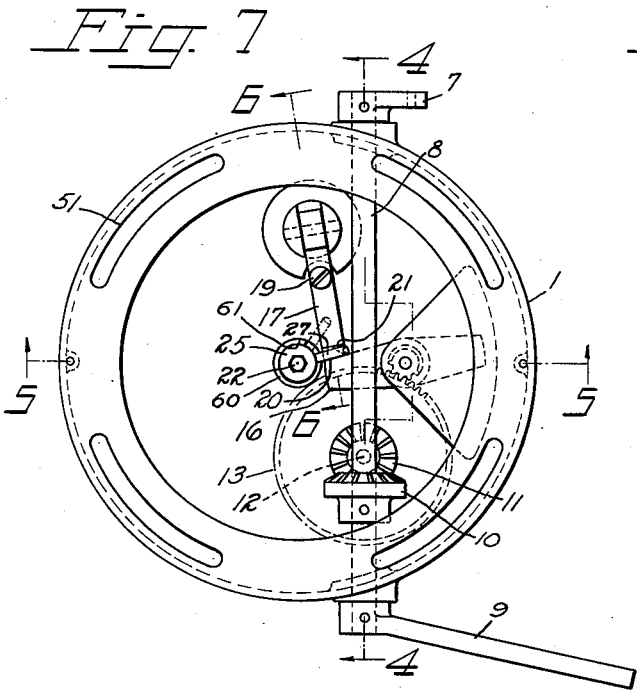
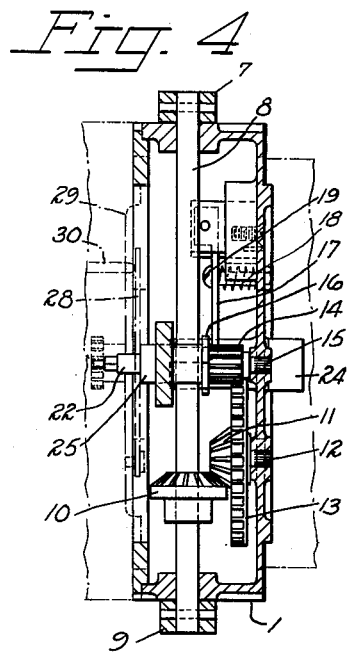
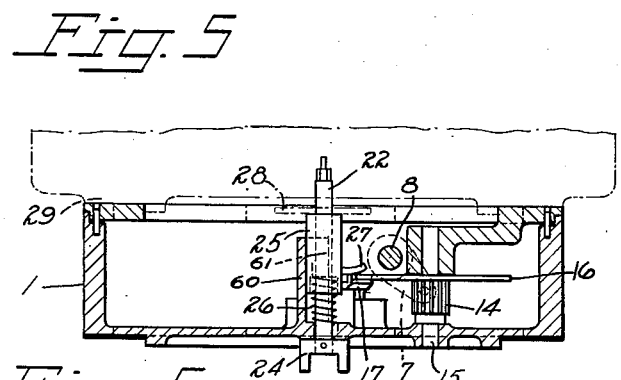
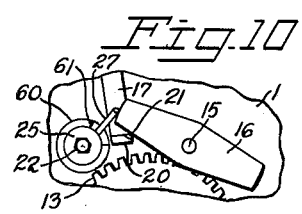
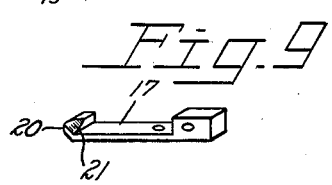
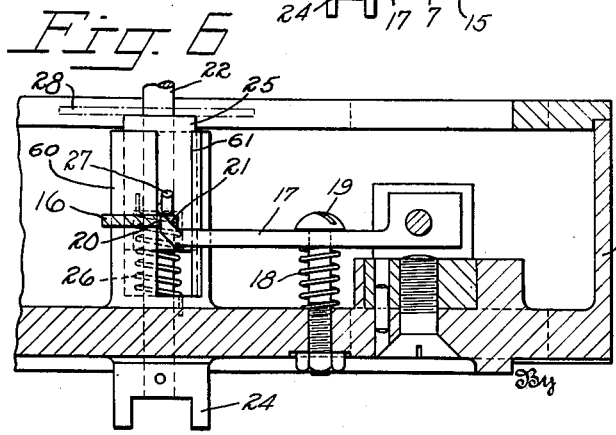
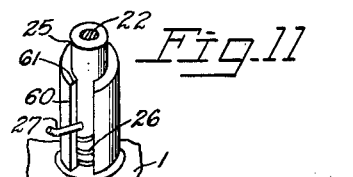
Inventor
HARVEY N. BLISS
By
N. Clay Lindsey
Attorney Patented Apr. 14, 1953

2,634,884

UNITED STATES PATENT OFFICE 2,634,884

CONTROL MECHANISM FOR CONTROLLING VALVES

Harvey N. Bliss, Windsor, Conn., assignor to Veeder-Root Incorporated, Hartford, Conn., a corporation of Connecticut Application October 8, 1946, Serial No. 701,923

20 Claims. (Cl. 222—20)

The present invention relates to control mechanisms, and more particularly to a control device for use with countermechanisms of the predeterminator type for automatically stopping an associated apparatus when a predetermined number of operations or units have been performed or counted.

While the control mechanism of the present invention has various applications, it is particularly useful in connection with dispensing apparatus, such as pumps for dispensing gasoline and the like. By way of example of the type of apparatus to which the present invention relates, the control mechanism may be associated with the predeterminator counter, valve and meter of a gasoline delivery truck. The quantity of gasoline which has been ordered or paid for may be manually set on the counter wheels of the counter and, when these wheels return to initial zero position under the drive of the meter, the counter functions the control device and the valve is automatically turned off.

It is an object of the invention to provide an improved and effective valve control mechanism for use with predeterminator types of register or counting mechanism by means of which an associated means such as a fluid valve may be closed in a stepwise fashion; that is to say, by degrees at two or more predetermined settings of the counter wheels whereby abrupt closing of the valve is avoided.

It is a further object of the invention to provide such a multiple shut off mechanism which is readily adaptable for use with conventional types of counting mechanisms and associated apparatus and which may be easily and economically constructed and which, at the same time, is efficient and effective in operation.

Other objects and advantages of the invention will be in part obvious and in part pointed out more in detail hereinafter.

The accomplishment of the above and other objects will be readily understood in connection with the following description of a specific embodiment of the invention shown in the accompanying drawings in which:

Figure 1 is a front view of the assembled device associated with a conventional fluid valve and meter;

Fig. 2 is a side view, partially in cross section, of the register with the cover removed;

Fig. 3 is a front view of the counter wheel units assembly;

Fig. 4 is a cross sectional view taken along a line 4—4 of Fig. 7 and looking in the direction of the arrows;

Fig. 5 is a cross sectional view taken along a line 5—5 of Fig. 7 and looking in the direction of the arrows;

Fig. 6 is a cross sectional view taken along a line 6—6 of Fig. 7 and looking in the direction of the arrows;

Fig. 7 is a cross sectional view taken along a line 7—7 of Fig. 2 and looking in the direction of the arrows;

Fig. 8 is a view in perspective of one of the counter wheels;

Fig. 9 is a perspective view of an element utilized in the specific embodiment of the device;

Fig. 10 is a fragmentary top plan view of the elements included in the control mechanism; and Fig. 11 is a perspective view of the means included in the control mechanism which is adapted to be actuated by the counter mechanism.

Referring to the drawings, and particularly to Fig. 1, the base 1 containing a valve control mechanism for operation by a predeterminator counter mechanism, which control is constructed in accordance with the invention, is shown mounted on a bracket 2 of a meter 3 and an associated valve 4. All of the parts, other than the base and counter mechanism, are shown in dot and dash lines because such other associated parts are conventional and commercially available in a variety of types. The meter and valve assembly, as such, form no part of the present invention.

Connected to the operating arm 5 of the valve 4 by means of a connecting rod 6 and crank arm 7 is a rotatable shaft 8 extending through the base 1 of the counter mechanism. A manually operable lever arm or handle 9 is fixed, for convenience, to one end of the rotatable shaft 8 to permit manual rotation of the shaft 8 and, through the connections described, operation of the valve operating arm 5.

Fixed to the shaft 8 is a bevel gear 10 in mesh with a bevel gear 11 mounted on a shaft 12, which gear 11 is secured to a spur gear 13 also mounted on the shaft 12, whereby the spur gear 13 is rotated in unison with the bevel gear 11.

The spur gear 13 meshes with a pinion 14 which is mounted on a shaft 15 along with a blade member or vane 16 adapted to rotate with the pinion 14. The gears 13 and 14 are of such relative size as to give a desired rotational movement of the vane 16 during closing movement of the valve 4. In the specific embodiment shown, a gear ratio of about eight to one has been chosen whereby movement of the handle 9 through an angle of about 45°, which is sufficient to fully open and close the valve 4, is accompanied by rotation of the vane 16 through one complete revolution of 360°. Inherent in this design is the result that a light force applied to the vane 16 will overcome a much greater force applied to the shaft 8.

Located centrally of the base 1 in a position to obstruct rotation of the blade member 16 is a pivoted arm 17 which is urged upwardly by a spring 18 while upward movement thereof is limited by the head of bolt 19. The free end of the pivoted arm 17 is provided with an upwardly turned flange 20 which is partially cut away to form a camming surface 21 along one side thereof. As a result of this construction of the end of the pivoted arm 17, the blade member 16 is permitted to rotate freely in a counterclockwise or valve opening direction (looking downwardly on the device as shown in Fig. 7) for, when the blade member or vane 16, during its rotation, meets the flange 20 of the pivoted arm 17, it forces the end of the arm downwardly by reason of the camming surface 21 so that the blade member 16 easily passes thereover. However, in the reverse rotation of the blade member or vane 16, the vane meets the flat side of flange 20 of the end of the pivoted arm 17 and further movement is prevented unless the end of the pivoted arm 17 is pushed downwardly by some other means.

There will now be described the means adapted to be actuated by the counter mechanism to move the pivoted arm 17 downwardly thereby freeing the vane 16 and permitting the valve 4 to move in a closing direction. A sleeve 25 is disposed about a centrally located shaft 22 and within a cylindrical housing 60 formed on the base 1. The centrally located shaft 22 is the main drive shaft for the counting mechanism and is adapted to be connected to the operating shaft 23 of the meter 3 by any suitable means, such as the connector 24. The sleeve 25 is urged upwardly by a spiral spring 26 extending between it and the base 1. The upper end of the spiral spring 26 is adapted to engage the sleeve while the lower end is adapted to engage the housing 60. As a result, rotational movement of the sleeve 25 is permitted but such movement is resiliently resisted by the spring 26. The spring 26 thus serves the dual function of providing an upwardly directed and a torsional force on the sleeve 25.

Fixed to the sleeve 25 is a pin 27 extending outwardly through a vertical slot 61 in the housing 60, and when the sleeve 25 is in its uppermost position with the pin 27 against the left hand edge of the slot 61, as viewed in Fig. 6, the pin 27 rests lightly upon the upper edge of the flange 20 at the end of the pivoted arm 17. When the sleeve 25 is depressed, the pin 27, by its engagement with the flange 20 of the pivoted arm 17, pivots the arm 17 downwardly so that the flange 20 no longer engages the vane 16. As a result of the biasing force on the valve 4, the vane immediately begins to move across the top of the flange 20 of the pivoted arm 17. In so doing, it meets the pin 27 and pivots it off the flange 20 as shown in Fig. 10 which movement of the pin is accompanied by a corresponding turning of the sleeve 25. When the vane 16 has cleared the top of the flange 20 of the pivoted arm 17, the pivoted arm 17 is free to move upwardly to its previous blocking position. That is because the pin 27 is no longer in engagement with the top of the flange 20 and thus no longer depresses the arm 17 sufficiently to clear the vane 16. As a result, the vane is permitted to move only one-half of a revolution regardless of the length of time during which the sleeve 25 is depressed.

In the preferred embodiment of the invention, it is desired to render the sleeve 25 effective to free the vane 16 for a half revolution, as previously described, when the sleeve is depressed to less than the full extent of the housing 60 so that further clearance exists between the sleeve 25 and the bottom of the housing whereby the sleeve may be further depressed to cause the arm 17 to clear the vane 16 even though the pin is no longer positioned on the flange 20. In this way, an emergency release (not shown in the drawing) which, for example, may be manually operated, may be provided to depress the sleeve to the full extent and permit the valve 4 to close in one complete movement.

It will be noted that the pin 27 is slightly curved at its outer free end. This structure is provided in the event that opening of the valve 4 is attempted while the sleeve 25 is in a depressed position. It will be seen that the rotation of the vane 16 in a counterclockwise direction will cause the vane to encounter the curved end of the pin 27 and cam it upwardly, thereby avoiding blocking of the apparatus.

When the sleeve 25 is released, the spring 26 returns the sleeve to its uppermost position and pivots the pin 27 back to its original position at the top of the flange 20.

The sleeve 25 at its upper end abuts against a pivotal member 28 pivotally fixed at one end to the plate 29 which is rotatably mounted on the base 1. The plate 29 is the base of the frame upon which is mounted the element of the counter mechanism. Adjacent the free end of the pivotal member 28 and extending through the plate 29 above the base 1 is a vertically movable pin 30. Downward movement of the pin 30 pivots the pivotal member 28 about its fixed end which, in turn, depresses the sleeve 25 against the resistance of spring 26 which, in turn, depresses the end of the pivoted arm 17 to release the blade member 16, as previously described.

It is an advantage of the foregoing disposition and combination of elements for depressing the pivoted arm 17, described above, that it is operable with counter mechanisms in which it is desired to have the plate 29 rotatable with respect to the base 1. As will be readily apparent, the sleeve 25 being disposed about the central drive shaft 22 and the pivotal member 28 and pin 30 being mounted on the plate 29, the mechanism will function effectively in any relative position of the plate 29 and base 1.

Referring to the drawings, it will be seen that provision has been made for the effective utilization of this advantage or feature of the invention. The base 1 and the plate 29 are secured to the meter bracket 2 by means of a plurality of bolts 50 which are received through elongated slots 51 in the top and bottom of the base 1. These bolts 50 are screwed into threaded holes 53 in the plate 29. For most installations it is preferred to utilize four bolts 50 and eight threaded holes 53 whereby the plate 29 may be positioned in any of eight relatively rotated positions with respect to the bracket 2. One bolt 50 extends through each pair of slots 51. It thus will be seen that the base 1 may readily be adjusted rotatably on the meter bracket 2 either within the limits of the elongated slots 51 or, if a proper positioning of the base 1 is not obtainable in this way, the bolts 50 may be withdrawn and the base 1 may be rotated to advance the slots 51 angularly with respect to the bolts 50 so that the bolts 50 may be reinserted into the next adjacent elongated slots 51, whereupon a new range of rotation is obtainable and so on through all combinations of the bolts 50 and slots 51.

As will be apparent from the previous description, the effectiveness of the valve control mechanism disposed within the base 1 is effective at any initial rotated position of the shaft 8. Taking this fact into consideration plus the fact that the base 1 is mountable selectively in a wide range of rotated positions on the meter bracket 2, it will be apparent that a substantially universal connection has been provided and that the valve control mechanism can be effectively connected to the associated valve 4 regardless of the position of the valve 4 whether above or below or to either side of the meter in a particular installation. Having selected a suitable positioning of the base 1 on the meter bracket 2 to permit a convenient connection between the crank arm 7 and the valve arm 5, it then is possible to mount the base plate 29 and the register mechanism mounted thereon in any convenient readable position with respect to the remaining elements of the combination as the base member 1 is rotatably adjustable with relation to both the meter and the counter, and the combination functions equally well in any selected relatively rotated position of the elements named.

In view of the centrally disposed drive shaft 22 extending between the counter mechanism and the meter 3, the drive between these elements, of course, is in no way affected by the relative rotated positions of the base 1 and plate 29 with respect to the meter bracket 2.

In the predeterminator counter mechanism shown in the drawing, the pin 30, extending through the plate 29, is connected by means of a connecting arm 31 to one end of a pivoted lever arm 32. The pivoted lever arm 32 is biased by the spring member 33 in a clockwise direction, as shown in Fig. 2, which is the direction necessary to depress pin 30 which, in turn, would release the blade member 16 as previously described. Clockwise movement of the pivoted lever arm 32, however, is controlled by the position of the predeterminating counter wheels 34, 35, 36, 37 and 38, as will be described more fully hereinafter.

The centrally located drive shaft 22 previously described in connected, by any suitable means such as the gear train generally denoted by the reference numeral 39, to the lowest order counter wheel unit 34 which, in the present specific example shown in the drawings, is a tenths counter wheel, said gear train or other connecting means being such that the proper relationship between the movement of the meter 3 and the counter wheel is established.

The tenths counter wheel unit 34 is mounted on a shaft 40 as also are the remaining counter wheel units 35, 36, 37 and 38. Suitable mechanism (not shown in the drawings) such as the conventional Geneva transfer mechanism is provided to cause movement of the counter wheel units such that, upon a complete revolution of the counter wheel unit of the lowest order, the next counter wheel unit will rotate one-tenth of a revolution, and so on. In the specific embodiment shown, windows 41 are provided for viewing the numeral wheels 35, 36, 37 and 38. As no window is provided for the counter wheel 34, it is unnecessary to provide indicia on the periphery of this wheel.

By way of completeness in describing the specific embodiment shown in the drawings, it may be stated that the visible counter wheels 35—38 are provided with setting knobs 42 so that each of the viewable counter wheels may be individually set to any desired number by mechanism not shown in the drawings and not forming a part of the present invention. As is generally provided in registers of this type, there also are provided the counter wheel units 43 operated synchronously with the predeterminating counter wheel units 34—38 to indicate the number of gallons of fluid as they are dispensed. The knob 44 is a manually operated knob for resetting the register wheels 43 to zero. This portion of the register mechanism is described only briefly and is not shown in detail in the drawings as it forms no part of the present invention.

Each of the counter wheels 34—38 is assembled with a disk member 45 adapted to rotate therewith. The peripheries of the disk members 45 form circumferential cam surfaces adapted to engage rollers 46 rotatably mounted on fingers 47 which, in turn, are connected to the pivoted lever arm 32. The engagement of the rollers 46 against the cam surfaces of disk members 45 prevents the lever arm 32 from pivoting in a clockwise direction which, through its connection with the pin 30, would free the vane 16 permitting the vane to rotate and the valve 4 to close.

Each of the disk members 45 is provided at its periphery with at least one notch 48 of sufficient size to receive the corresponding roller 46 when the counter wheel unit is rotated to a position in which the notch is aligned with the roller. In the specific embodiment shown, a single notch is located in each of the disk members 45 associated with the counter wheel units 35—38 so that they align with each other and with their corresponding rollers 46 when each of the counter wheel units 35—38 registers zero. In addition to the notches just mentioned, there is a second additional notch 48a in the disk member 45 of the counter wheel unit 35 positioned to align with notches associated with counter wheel units 36, 37 and 38 when these latter units register zero and counter wheel unit 35 registers other than zero. In the specific embodiment, a reading of two gallons has been selected as the setting when notch 48a aligns with notches 48 of wheel units 36, 37 and 38. The single notch 48 of disk member 45 of counter wheel 34 also is positioned so as to align with the notches of the remaining wheel units when the wheel 34 is at other than zero position. In the specific embodiment, a reading of five-tenths of a gallon on wheel 34 (assuming it were provided with proper indicia) would serve to align notch 48 thereof with the notches in the remaining wheel units. The notch 48 associated with counter wheel unit 34 is preferably somewhat elongated as compared with the remaining notches because of the relatively much greater speed of this wheel and the possibility that, as a result, the roller might fail to enter the notch.

The extent of the downward thrust of the pivoted arm 32 on the pin 30 is determined by the size of the notches previously described and the length of the arm 30, these being designed so that sliding movement of the sleeve is just sufficient to produce the step by step release of the vane 16 as previously described.

In the operation of the device, the counter wheels 43 are set to zero by means of the knob 44 and the visible predeterminating counter wheels 35—38 are set by the individual setting knobs 42 to indicate the number of gallons or other units of fluid which it is desired to dispense. The register is thus conditioned for operation.

The operator then manually actuates the lever arm 9 in a downwardly direction which, by means of the above-described connections with the valve lever 5, opens the valve to its full extent against the pressure of the usual valve biasing means such as the means indicated by reference numeral 70 in Fig. 1. The downward movement of the lever arm 9, which in most installations will be about 45° in order to fully open the valve 4, rotates the shaft 8 and, through the gearing described, turns the vane 16 through approximately one complete revolution. Rotation of the blade member 16 during the valve opening operation is not prevented by the pivoted arm 17 in view of the camming action previously described. However, when the operator releases the lever arm 9 and the lever arm is urged upwardly as a result of the valve biasing means, movement of the lever arm 9 is prevented by the engagement of the blade member 16 against the upwardly turned edge 20 of the pivoted arm 17 when it attempts to rotate in a clockwise direction. Thus, the valve is retained in open position and dispensing takes place.

The opening of the valve 4 permits fluid to pass through the meter 3 which, by its operative connection with the register, gradually returns the counter wheels 34—38 to zero. At the same time, the register wheels 43 move in the positive direction to indicate the total gasoline dispensed during that operation. When the three predeterminator counter wheel units of higher order (36—38) all indicate zero, their associated notches 48 are in alignment and, as far as these wheels are concerned, the pivoted arm 33 is free for limited pivoting movement to depress the pin 30. When the counter wheels 36—38 first reach zero indication, the two lowest order wheels 35 and 34 will register nine and nine-tenths of a gallon, respectively. As dispensing continues, the notch 48a in the disk member 45 associated with the counter wheel 35 will gradually be rotated into alignment with the notches 48 of the counter wheels 36, 37 and 38, attaining such alignment when, in the specific embodiment shown, counter wheel unit 35 registers two gallons. At this point, pivoting movement of arm 32 is prevented solely by disk 45 of counter wheel unit 34. Obviously, when this counter wheel unit 34 is then rotated past the five-tenths position, the pivoted arm 32 is permitted to function to release the vane 16 for rotation through one-half revolution, as previously described, thereby closing the valve 4 about half way. On the next rotation of wheel unit 34 through the five-tenths position, when unit 35 will have rotated to the one gallon position with neither its notch 48 or 48a in alignment with the notches of the remaining wheel units. Accordingly, no movement of lever arm 32 takes place and dispensing continues at the previously reduced rate until wheel unit 35 registers zero and wheel unit 34 again reaches the five-tenths positions. At this time, the second release of the valve 4 occurs fully closing the valve and the wheel unit 34 will coast to zero.

The invention has been particularly described in connection with an embodiment in which the valve 4 is turned off in two stages or operations when the counter wheel units register 2.5 and .5 gallons. This has been done merely for convenience and clarity of presentation, and it will be readily apparent other readings might have been selected or that, by suitable modification of the gear ratio between the vane 16 and the valve 4 and by the provision of additional notches in the disks 48, the valve 4 may be closed in as many stages as desired.

It will thus be seen, in view of the above description, that, in accordance with the present invention, there has been provided a valve control mechanism operable by a predeterminating counter mechanism which effectively reduces the flow near the end of the dispensing operation and then completely shuts off the flow when the full amount desired has been dispensed. The mechanism disclosed is efficient in operation and relatively simple to construct, whereby an improved predeterminator type of operation is provided for the varied uses mentioned.

It will be apparent to one skilled in the art that the valve control mechanism of the present invention may be operated by other mechanism including predeterminator counter mechanisms other than that specifically disclosed herein. The specific predeterminator counter mechanism herein disclosed is not claimed as part of the present invention but is the subject matter of my copending application Serial No. 712,575, filed November 27, 1946, now Patent No. 2,524,755.

It will also be apparent that, in light of the above disclosure, one skilled in the art will be able to modify the device disclosed within the scope of the invention, and all such modifications are intended to be included within the scope of the following claims.

I claim as my invention:

1. A valve control mechanism for use with a predeterminator counter or the like comprising a rotatably mounted vane, means for connecting the vane to a biased valve whereby the vane will be rotated through at least one complete revolution during closing movement of the valve, an arm pivotally mounted at one end and having a flange at the other end, means biasing the arm into position with the flange obstructing rotation of the vane in a valve closing direction, an operating member adapted to be actuated by said counter having means for engaging said flange to move the flange out of obstructing position when the member is moved by the counter, said member being mounted for limited rotational movement whereby the last named means may be rotated out of engagement with the flange by the vane as it is released past the flange, and spring means for returning the member to original position.

2. A valve control mechanism of the type for use with a predeterminator counter or the like comprising a rotatably mounted vane, means for connecting the vane to a biased valve whereby the vane will be rotated through at least one complete revolution during closing movement of the valve, an arm pivotally mounted at one end and having a flange at the other end, means biasing the arm into a position where the flange obstructs rotation of the vane in a valve closing direction, an axially and rotatably movable sleeve having an extension for engaging the flange, means operable by said counter for actuating the sleeve in an axial direction to move the flange out of obstructing position, said extension being pivoted out of engagement with the flange by the released vane whereby the flange is permitted to return to obstructing position, and spring means for returning the sleeve to original position upon release of the actuating means.

3. A valve control mechanism comprising a rotatably mounted member, means adapted to form a reversible driving connection between said member and a valve of the type which is biased in a closing direction for rotating the member when the valve is actuated, movable means biased into engagement with the rotatable member to prevent rotation thereof in a valve closing direction, means for moving the movable member out of engagement with the rotatable member to permit movement of the valve in a closing direction, means actuated by the released rotatable member to release the movable member for reengagement with the rotatable member, a counter mechanism having indicating means, and means responsive to position of said indicating means for repeatedly actuating the releasing means whereby the valve is permitted to close in a stepwise fashion.

4. A valve control mechanism comprising, in combination, a shaft, means for connecting said shaft to a fluid valve whereby movement of said valve is dependent upon rotation of said shaft, a rotatable member rotated by the shaft, a movably mounted member, means urging said member into position for obstructing rotation of the rotatable member in a valve closing direction, operating means having an element for pressing said movably mounted member out of obstructing position to permit the rotatable member to rotate in a valve closing direction, said element being normally in the path of rotation of the released rotatable member and being pivotable thereby when the rotatable member is released to disengage the movably mounted member for return to obstructing position, a counter mechanism having indicating means adapted to be driven by a meter associated with said valve, a biased lever arm for actuating said operating means, and means responsive to position of said indicating means for releasing said biased lever arm upon the dispensing of predetermined quantities of fluid whereby the valve is closed in a stepwise manner.

5. A valve control mechanism for actuation by a predeterminator counter or the like comprising, in combination, movable means for connection to a biased valve, a rotatable member, a reversible drive between the movable means and the rotatable member for rotating the member when the valve is actuated, movably mounted stop means engageable with the rotatable member, means biasing the stop means into engagement with the rotatable member, means responsive to movement of the rotatable member in a valve opening direction for disengaging the stop means from engagement with the rotatable member, and means actuatable by the predeterminator counter mechanism for disengaging the stop means from engagement with the rotatable member.

6. A valve control mechanism for actuation by a predeterminator counter or the like comprising, in combination, movable means for connection to a biased valve, a rotatable member, a reversible drive between the movable means and the rotatable member, movably mounted stop means engageable with the rotatable member to prevent rotation thereof in a valve closing direction, means biasing the stop means into engagement with the rotatable member, cam means on the stop means engageable by the rotatable member to cam the stop means out of stopping engagement with the rotatable member when the member is rotated in a valve opening direction, and means actuatable by the predeterminator counter mechanism for disengaging the stop means from engagement with the rotatable member.

7. A valve control mechanism for actuation by a predeterminator counter or the like comprising, in combination, movable means for connection to a biased valve, a rotatable member, a reversible drive between the movable means and the rotatable member, a stop member mounted for movement transversely of the plane of rotation of the rotatable member and movable into and out of the path of rotation of the rotatable member, means biasing the stop member into said path of rotation, interengageable camming surfaces on the rotatable member and stop member for camming the stop member out of the path of rotation when the rotatable member is rotated in a valve opening direction, and means engaging the stop member for actuation by the predeterminator counter to move the stop member transversely of the plane of rotation of the rotatable member to permit movement of the rotatable member in a valve closing direction.

8. A valve control mechanism for actuation by a predeterminator counter or the like comprising, in combination, movable means for connection to a biased valve, a rotatable member, a reversible drive between the movable means and the rotatable member for rotating the member when the valve is actuated, stop means for preventing rotation of the rotatable member in a valve closing direction and mounted for movement into and out of stopping position, and disengageable means actuatable by said counter to momentarily move the stop means out of stopping position, said disengageable means being moved to disengaging position upon release of the rotatable member.

9. A valve control mechanism for actuation by a predeterminator counter or the like comprising, in combination, movable means for connection to a biased valve, a rotatable member, a reversible drive between the movable means and the rotatable member for rotating the member when the valve is actuated, stop means for preventing rotation of the rotatable member in a valve closing direction and mounted for movement into and out of stopping position, means biasing the stop means into stopping position, and actuatable means for moving the stop means out of stopping position mounted for actuation by the predeterminator counter, and said rotatable member being arranged to disengage the actuatable means from the stop means when the rotatable member is released.

10. A valve control mechanism for actuation by a predeterminator counter or the like comprising, in combination, movable means for connection to a biased valve, a vane mounted for rotation, a driving connection between the movable means and the vane for rotating the vane when the valve is actuated, a pivotal member mounted for pivoting movement into and out of the path of rotation of the vane, means biasing the member into said path of rotation, and means actuatable by the counter having an element movable in one direction for pivoting the pivotal member out of said path of rotation, and movable in a second direction to release the pivotal member for return to said path of rotation.

11. A valve control mechanism for actuation by a predeterminator counter or the like comprising, in combination, movable means for connection to a manually operable fluid valve of the type which is biased in a closing direction, a rotatable vane, a driving connection between the movable means and the rotatable vane, a member pivotally mounted for movement into and out of engagement with the vane in a plane substantially parallel to the axis of rotation of the vane, means biasing the pivoted member into engagement with the vane, cam means on the pivoted member engageable by the vane to pivot the member out of engagement therewith when the vane is rotated by movement of the valve in an opening direction, and self-disengaging means operable by the counter for pivoting the pivoted member out of engagement with the vane.

12. A valve control mechanism for actuation by a predeterminator counter or the like comprising a rotatably mounted member, means for rotating the rotatable member and actuatable by a fluid valve of the type which is biased in a closing direction, movable means engageable with the rotatable member to hold the rotatable member in positions corresponding to an open and a partially open position, respectively, of the valve, means biasing the movable means into engagement with the rotatable member, interengaging camming surfaces on the rotatable member and movable means for camming the movable means out of holding position when the rotatable member is rotated in a valve opening direction, and a tripping device operable by the counter for moving the movable means out of holding position, said tripping device being movable by the rotatable member to a position releasing the movable means when the rotatable member is released.

13. A valve control mechanism for actuation by a predeterminator counter or the like comprising a shaft, means for connecting the shaft to a fluid valve of the type which is biased in a closing direction whereby the shaft is rotated during movement of the valve, a rotatably mounted vane, a gear train connecting said vane to the shaft whereby rotation of the shaft will rotate the vane at a higher rate of speed, a pivoted member for engaging the vane to prevent rotation of the vane in a valve closing direction, and means actuatable by the said counter for tripping the pivoted member, said means including a releasable element for holding the pivoted member out of engagement with the vane which element is released by movement of the vane past the pivoted member.

14. A valve control mechanism for use with a predeterminator counter or the like comprising a rotatably mounted vane, means adapted to be connected to a biased valve including a gear train for driving said vane through a plurality of revolutions during opening and closing movement of the valve, a pivoted member for engaging the vane to prevent its rotation, means biasing the pivoted member into engagement with the vane, cam means on the pivoted member engageable by the vane to force the pivoted member out of engagement therewith when the vane is rotated in the direction of opening movement of the valve, and a tripping device operable by the said counter for said pivoted member to cause the vane to be released for limited rotation in a valve closing direction comprising a member movable in one direction to disengage the pivoted member and movable in a transverse direction by the released vane to release the pivoted member for reengagement with the vane.

15. A valve control mechanism for use with a predeterminator counter or the like comprising a rotatably mounted vane, driving means for the vane for connection to a biased valve to cause rotation of the vane through at least one complete revolution during closing movement of the valve, a member mounted for movement into and out of engagement with an extremity of the vane, means biasing the member into engagement with the vane, and means engageable with the member movable by the said counter to a position for holding the member out of engagement with the vane, said means being mounted for pivoting movement out of such holding position by engagement with the released vane.

16. A valve control mechanism for use with a predeterminator counter or the like comprising a rotatably mounted vane, means for connecting the vane to a biased valve whereby the vane will be rotated through at least one complete revolution during closing movement of the valve, and means for engaging and disengaging said vane to permit it to rotate in a valve closing direction in stages of one-half revolution each, said means comprising a stop movable into and out of vane engaging position, means biasing the stop into vane engaging position, a member mounted for translating movement to disengage the stop and pivoting movement to release the stop, and means for connection to the said counter for imparting translating movement to the member, said member being engageable by the released vane to pivot the member into stop releasing position.

17. A valve control mechanism for use with a predeterminator counter or the like comprising a rotatably mounted vane, means for connecting the vane to a biased valve whereby the vane will be rotated through at least one complete revolution during closing movement of the valve, an arm pivotally mounted at one end and having a flange at the other end, means biasing the arm into position with the flange obstructing rotation of the vane in a valve closing direction, a member mounted for reciprocal movement in the plane of pivoting movement of the arm and for pivoting movement into and out of the path of rotation of the vane, said means being reciprocable by the counter mechanism to disengage the arm from the vane, and being pivotable by the released vane to release the arm for reengagement with the vane.

18. A valve control mechanism comprising in combination a rotatable member, means for connecting the member to a fluid valve to cause the member to be rotated when the valve is actuated, an arm pivotally mounted at one end and at the other end forming an obstruction to rotation of the member in a valve closing direction, said arm having a cam surface whereby the arm may be pivotally cammed out of obstructing position by rotation of the member in a valve opening direction, means biasing the arm into obstructing position, means for pivoting the arm into non-obstructing position comprising an element mounted for translating movement in contact with the arm but being pivotal into inoperative position by contact with the released rotatable member, a counter mechanism having indicating means adapted to be actuated by a meter associated with said valve, and means for actuating said means for pivoting the arm in response to predetermined positions of said indicating means whereby the valve may be closed in a stepwise fashion during a dispensing operation.

19. A valve control mechanism comprising in combination, a rotatably mounted vane, motion transmitting means for connection to a biased valve constructed and arranged to rotate the vane through at least one complete revolution during closing movement of the valve, an arm pivotally mounted at one end and having a flange at the other end, means biasing the arm into a position where the flange obstructs rotation of the vane by engagement with an extremity of the vane, cam means on the arm whereby the vane may cam the flange out of obstructing position during rotation in a valve opening direction, a movable member mounted for movement to engage said flange and to move same out of obstructing position, said member also being pivotally arranged so as to be cammed to a releasing position during the movement of the released vane across the flange, whereby the arm is permitted to return to obstructing position, thereby limiting rotation of the vane to half a revolution, means for returning the movable member to original position, a counter mechanism having indicating means adapted to be actuated by a meter associated with said valve, and means for actuating said movable member in response to predetermined positions of said indicating means whereby the valve is closed in a stepwise fashion.

20. The combination adapted to be utilized with a valve biased in closing direction and a meter for measuring the quantity of liquid flowing through said valve comprising a housing, valve control mechanism disposed within said housing including a rotatable shaft extending transversely outwardly from the housing, means on said housing for mounting the same on the meter in a plurality of rotated positions, a predeterminator counter having a casing provided with means for mounting the same on said housing in a plurality of rotated positions, a counter drive shaft operable by the meter and extending through said housing to said counter and operatively connecting the meter and the counter in any of the rotated positions of said housing and said casing, linkage means interconnecting said rotatable shaft and valve, stop means included in said control mechanism engaging said rotatable shaft in rotated positions thereof to hold said valve in opened position, releasing means included in said valve control mechanism for engaging said stop means to release said rotatable shaft and permit the valve to close, and actuating means included in said valve control mechanism operable by said counter in any rotated position of the casing and housing to actuate said releasing means.

HARVEY N. BLISS.

References Cited in the file of this patent

UNITED STATES PATENTS

| Number | Name | Date |
|---|---|---|
| 1,759,396 | Granberg | May 20, 1930 |
| 2,114,207 | Berck | Apr. 12, 1938 |
| 2,137,013 | Bradley | Nov. 15, 1938 |
| 2,228,820 | Griffith | Jan. 14, 1941 |